United States Patent
Kim et al.

(10) Patent No.: US 8,677,195 B2
(45) Date of Patent: Mar. 18, 2014

(54) DATA TRANSMISSION METHOD USING ACK TRANSMISSION OPPORTUNITY IN WIRELESS NETWORK

(75) Inventors: Chong-Kwon Kim, Seoul (KR); Taemin Park, Busan (KR); Suchul Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 244 days.

(21) Appl. No.: 13/243,213

(22) Filed: Sep. 23, 2011

(65) Prior Publication Data

US 2012/0218949 A1    Aug. 30, 2012

(30) Foreign Application Priority Data

Feb. 24, 2011   (KR) .................. 10-2011-0016432

(51) Int. Cl.
*G06K 5/04* (2006.01)

(52) U.S. Cl.
USPC ........................................................ 714/699

(58) Field of Classification Search
USPC .......... 375/240, 240.01, 240.02, 240.07, 229, 375/230, 232, 233; 455/7, 24
See application file for complete search history.

(56) References Cited

U.S. PATENT DOCUMENTS

| | | | |
|---|---|---|---|
| 7,496,076 B2* | 2/2009 | Takagi et al. | 370/338 |
| 7,649,911 B2* | 1/2010 | Moreton | 370/506 |
| 7,706,408 B2* | 4/2010 | Takagi et al. | 370/473 |
| 2010/0189056 A1* | 7/2010 | Nishibayashi et al. | 370/329 |
| 2010/0220678 A1* | 9/2010 | Wentink | 370/329 |
| 2010/0232452 A1* | 9/2010 | Takagi et al. | 370/445 |
| 2010/0315979 A1* | 12/2010 | Surineni et al. | 370/310 |

* cited by examiner

*Primary Examiner* — Fan Ng

(57) ABSTRACT

Disclosed is a data transmission method in a wireless network capable of improving transmission performance on a wireless network by transmitting data, on which ACK is piggybacked, using the ACK transmission opportunity having high priority. The data transmission method includes acquiring a wireless channel by a STA to transmit a first data to the AP, transmitting the first data by the STA acquired the wireless channel to the AP through the wireless channel, analyzing by the AP whether there are second data intended to any one of the plurality of STAs, and, if there are the second data to transmit, transmitting the second data, on which an ACK is piggybacked, to the intended STA from the AP using ACK transmission opportunity having higher priority than that of data transmission.

12 Claims, 9 Drawing Sheets

DATA TRANSMISSION METHOD USING ACK TRANSMISSION OPPORTUNITY IN WIRELESS NETWORK

CROSS-REFERENCE TO RELATED APPLICATIONS

This application claims priority under 35 U.S.C. §119 to Korean Patent Application No. 10-2011-0016432, filed on Feb. 24, 2011, in the Korean Intellectual Property Office, the disclosure of which is incorporated herein by reference in its entirety.

TECHNICAL FIELD

The present invention relates to a data transmission method using ACK transmission opportunity in a wireless network, and more particularly, to a data transmission method using ACK transmission opportunity in a wireless network capable of improving transmission performance on a wireless network by transmitting data, on which ACK is piggybacked, using ACK transmission opportunity having high priority.

BACKGROUND

A wireless network is configured of an access point (AP) and a plurality of stations (STAs), wherein the AP transmits and receives data to and from the STAs through a wireless channel. After each data transmission from STAs, an acknowledge receipt (ACK) should be send back after a time interval of a short interframe space (SIFS). There is no problem when the AP only has an ACK packet to transmit. However, if the AP has both ACK and data to transmit, the transmission performance of the wireless network may be degraded.

That is, since the ACK has higher priority than data, the AP first transmits the ACK and then, transmits data. In this case, the AP transmits data to the STAs after wireless channel contention and DCF interframe space (DIFS) time elapse. The data transmission is delayed due to the interval of the channel contention and the DIFS time, such that data amount that can be processed in the wireless network is remarkably reduced, thereby degrading the transmission performance.

To solve this problem, a piggybacking scheme, which piggybacks the ACK on a MAC protocol data unit (MPDU) and the MPDU on which the ACK is piggybacked is transmitted at a low data bit rate so as to secure stability and reliability of the ACK transmission, is proposed. However, the MPDU needs to be transmitted at a low data bit rate so as to secure the stability and reliability of the ACK transmission even if the data may be transmitted at a high-speed bit rate, such that the transmission performance of the wireless network may be remarkably degraded.

SUMMARY

An exemplary embodiment of the present invention provides a data transmission method using an ACK transmission opportunity in a wireless network including an AP and a plurality of STAs, the method including: acquiring a wireless channel by a STA to transmit a first data to the AP; transmitting the first data by the STA acquired the wireless channel to the AP through the wireless channel; analyzing by the AP whether there are second data intended to any one of the plurality of STAs; and, if there are the second data to transmit, transmitting the second data, on which an ACK is piggybacked, to the intended STA from the AP using ACK transmission opportunity having higher priority than that of data transmission.

The method may further comprise transmitting the ACK to the intended STA through the MAC layer if it is analyzed that there are no second data.

The transmitting the second data may include piggybacking the ACK on the second data in the PHY layer and transmitting the second data on which the ACK is piggybacked to the intended STA.

The STA may acquire the wireless channel from contention with other STAs in the acquiring.

The ACK may be piggybacked the between SFD (start frame delimiter) and PLCP (physical layer convergence procedure) Header of the second data frame, and the ACK may include: a signature field on which destination information of the ACK is specified; a consecutive transmission counter field for securing fairness between the STAs; and a reserved field.

The ACK may be transmitted at a data bit rate of the PHY layer and the second data may be transmitted at a data bit rate of the MAC layer.

The ACK may be piggybacked in the middle of SFD of the second data frame, and, in this case, the ACK may include: an SFD field for the ACK; a signature field on which destination information of the ACK is specified; a consecutive transmission counter field for securing fairness between the STAs; and a reserved field.

Other features and aspects will be apparent from the following detailed description, the drawings, and the claims.

DETAILED DESCRIPTION OF EMBODIMENTS

Figure 1:
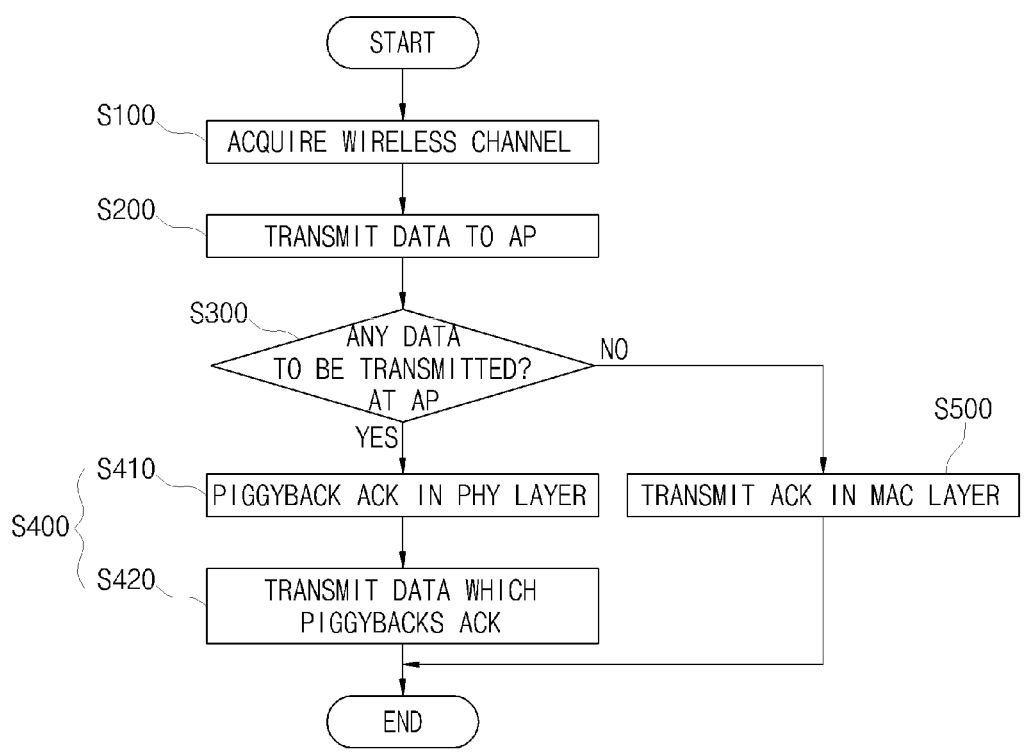
FIG. 1 is a flow chart showing an exemplary embodiment of a data transmission method using an ACK transmission opportunity in a wireless network according to an exemplary embodiment of the present invention.

Throughout the specification, an access point (AP) means an apparatus that serves as a repeater in a wireless network and a station (STA) means an apparatus that is connected to the AP through a wireless channel. In addition, an acknowledge character (ACK) means a receiving response signal, a short interframe space (SIFS) means a packet transmission time interval between the AP and the STA, and a DCF interframe space (DIFS) and a backoff mean the packet transmission time interval within the AP or the same STA. In addition, an MAC layer, which is one of 7 layers of an open system interconnection (OSI) model, is generally referred to as a data link layer and serves to transmit reliable information between two adjacent devices through a physical connection and a PHY layer, which is one of 7 layers of an open system interconnection (OSI) model, is generally referred to as a physical layer and serves to transmit electrical signals (energy) through a communication cable using electrical and mechanical characteristics.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a flow chart showing an exemplary embodiment of a data transmission method using ACK transmission opportunity in a wireless network of the present invention. According to the data transmission method using the ACK transmission opportunity in the wireless network, an STA having data acquires a wireless channel to transmit the data to an AP (S100). The STA acquired a channel transmits the data to the AP through the wireless channel (S200). The AP analyzes whether there are data to be transmitted to any one of the STAs (S300). If there are data to be transmitted at S300, the AP transmits data, on which an ACK is piggybacked, using an ACK transmission opportunity having higher priority than the data (S400). Later, the steps S400 and S500 will be described in more detail.

Figure 2:
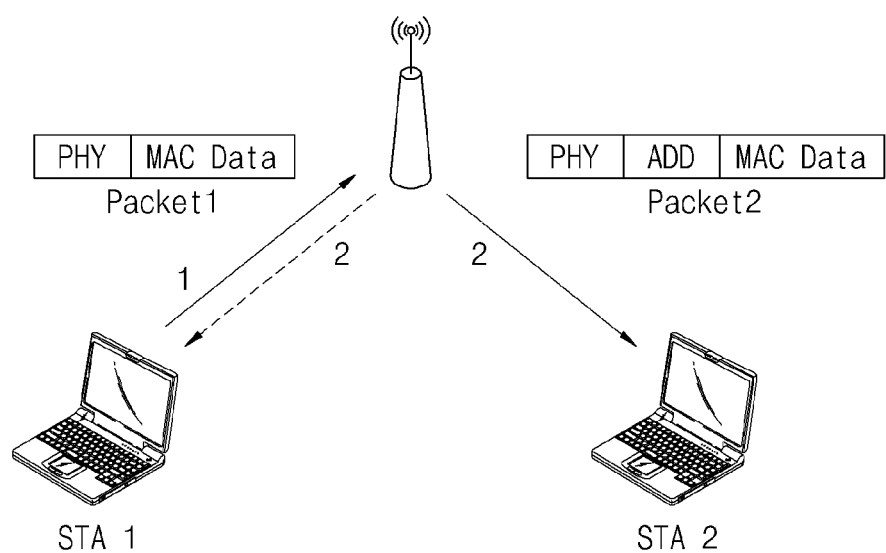
FIG. 2 is a configuration diagram showing a data and ACK transmission flow according to the exemplary embodiment of the present invention.

A wireless network is configured of an access point (AP) and a plurality of stations (STAs), wherein the AP transmits and receives data to and from the STAs through a wireless channel. FIG. 2 shows a wireless network configured to include AP, STA1, and STA2. The wireless network will be described in detail with reference to FIG. 2. For simplicity, the particular network shown in FIG. 2 is used to explain the embodiment of the present invention, however all possible networks which uses piggybacking can adopt the method of the embodiment of the present invention to enhance performance.

S100 is a step of acquiring a wireless channel by an STA intending to transmit data to the AP, and the STA acquires the wireless channel through contention with other STAs. For example, when the STA1 intends to transmit the data to the AP, the STA1 acquires the wireless channel through the contention with the STA2.

S200 is a step of transmitting the data by the STA to the AP through the acquired wireless channel. Referring to FIG. 2, the STA1 acquired the wireless channel through the contention between the STAs transmits the data to the AP (arrow 1), in which the data are transmitted to the AP through the MAC layer.

S300 is a step of analyzing whether there are the data to be transmitted to any one STA by the AP. Referring to FIG. 2, the AP received the data from the STA1 analyzes whether there are data to be transmitted to the STA1 or the STA2. That is, the AP analyzes whether there are data to be transmitted to the STA1 transmitting the data as well as the STA2.

If it is analyzed that there are no data to be transmitted at S300, AP transmits the ACK to the STA1 through the MAC layer (S500). In this case, after the data transmission from STA1 to AP is completed and the time interval of the SIFS elapses, the ACK is transmitted to the STA1.

If it is analyzed that there are data to be transmitted at S300, the AP transmits the data using the ACK transmission opportunity, which has higher priority than that of the data (S400). For example, after the AP received the data from the STA1, when there are data to be transmitted to the STA1, the AP piggybacks the ACK to the data to be transmitted to the STA1 and transmits the data on which the ACK is piggybacked, thereby transmitting the data to the STA1 while transmitting the ACK to the STA1. On the other hand, after the AP received the data from the STA1, when there are data to be transmitted to the STA2, the AP piggybacks the ACK to the data to be transmitted to the STA2 and transmits the data on which the ACK is piggybacked, thereby transmitting the data to the STA2 while transmitting the ACK to the STA1.

As described above, the exemplary embodiments of the present invention can improve the transmission performance of the wireless network by transmitting the data, on which the ACK is piggybacked, using the ACK transmission opportunity having higher priority and thus transmitting the data while transmitting the ACK so as not to consume the channel contention time and the DIFS time.

Figure 3A:
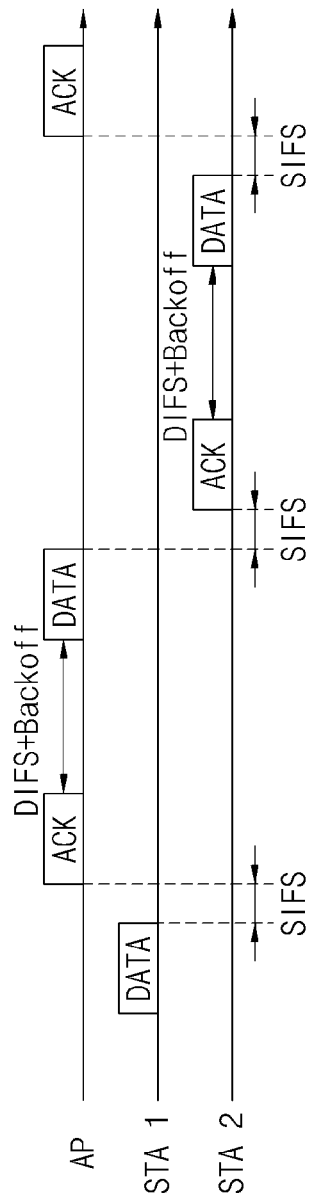
FIG. 3A is a diagram showing an ACK transmission flow according to a method of the related art.
Figure 3B:
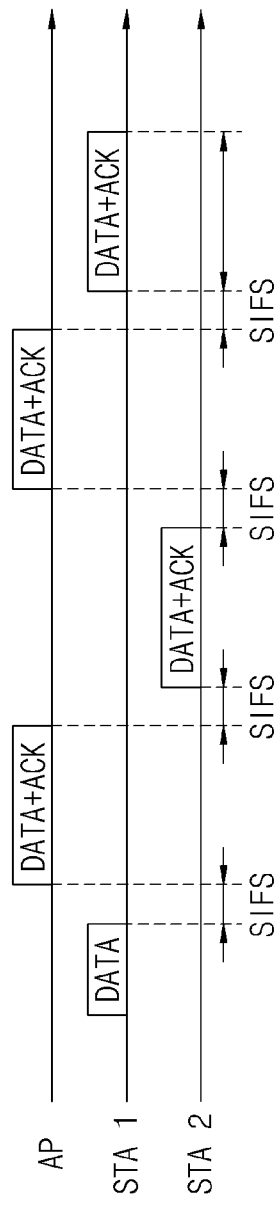
FIG. 3B is a diagram showing the ACK transmission flow according to the exemplary embodiment of the present invention.

FIGS. 3A and 3B are diagrams showing an ACK transmission flow according to a method of the related art and of the exemplary embodiment of the present invention, respectively.

As shown in FIG. 3A, the STA1 acquired the wireless channel from the contention transmits the data to the AP. On receiving the data from the STA1, AP has to acknowledge receipt of the data. Consider that the AP has another data frame intended to the STA2. According to the related art, the AP has to wait SIFS and send ACK before the channel contention. If the AP wins the contention, the AP can transmit the data.

According to the exemplary embodiment of the present invention, the STA1 acquired the wireless channel through the contention first transmits the data to the AP and the AP received the data transmits the data on which the ACK is piggybacked after the time interval of the SIFS, as shown in FIG. 3B. In this case, the ACK acknowledging the data transmission from the STA1 is transmitted to the STA1 and the data are transmitted to the STA2.

Then, the STA2 received the data from the AP transmits the data on which the ACK is piggybacked after the time interval of the SIFS. In this case, the ACK acknowledging the data transmission from the AP is transmitted to the AP and the data are also transmitted to the AP, so that the destinations of the ACK and the data are the same.

As described above, according to the exemplary embodiment of the present invention, when the ACK and the data are transmitted from the node, the channel contention time and the DIFS+Backoff time are not required, so that the data transmission time is remarkably reduced as compared with the method of the related art. As a result, the throughput of the wireless network can be remarkably increased.

The step S400 includes piggybacking the ACK on the data in PHY layer (S410) and transmitting the data on which the ACK is piggybacked to the STAs (S420). That is, the data are transmitted while transmitting the ACK by piggybacking the ACK in PHY layer, which we call it Cross-Layer ACK (CLACK).

Figure 4:
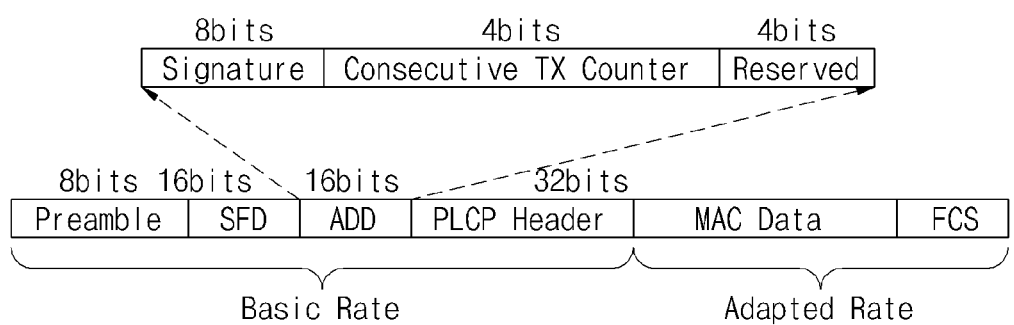
FIG. 4 is a diagram showing a frame structure according to an embodiment of the present invention.

The ACK piggybacked on the data in step S420 includes a signature, a consecutive TX counter, and reserved fields as shown in FIG. 4. Referring to FIG. 4, the ACK is shown as ADD, wherein the ADD includes the signature, the consecutive TX Counter, and the reserved fields, and lengths of the signature, the consecutive TX Counter, and the reserved fields are 8 bits, 4 bits, and 4 bits, respectively.

The signature specifies the destination information of the ACK and has 8-bit length to represent $2^8$ nodes. Since only targeted receiver of the control message should be notified, the destination address of the control message is mandatory especially when the data and the control message are intended to the other nodes. The signature is uniquely computed from the intended receiver's identifier such as a physical or IP address, and should be unique only within the operated local network setting, needing a few bits to specify it.

The consecutive TX counter is to ensure the fairness of the nodes considering that number of consecutive transmission has to be limited. Otherwise, highly offered load set of nodes will have an opportunity to access the wireless medium in a unfair manner. The consecutive TX counter is to indicate number of successive ACK piggybacked data transmission and has $\beta_{max}$ as a maximum value. Each node takes a decision whether the current consecutive transmission counter $\beta$ is smaller than $\beta_{max}$ to determine whether the ACK with or without piggybacking data to transmit. In result, the nodes again content for the wireless channel after discontinuous transmission opportunity (TXOP), such that the fairness of the wireless network system is not deteriorated as compared with the related art. 4 bits are assigned for the consecutive TX counter, expressing up to $2^4$ transmissions. In addition, $\beta_{max}$ may be adaptively set.

According to an embodiment of the present invention, the ACK can be piggybacked between an SFD and a PLCP Header, as shown in FIG. 4.

Referring to FIG. 4, the data frame includes preamble, starting frame delimiter (SFD), PLCP Header, MAC Data, and FCS, wherein the preamble has 80 bits, the SFD has 16 bits, and the PLCP Header has 32 bits. The preamble is for the synchronization of the data frame and the STA consecutively detects the preamble so as to detect the ongoing transmission. The SFD is attached immediately after the preamble as a bit stream for frame synchronization informing the fact that the SFD is configured in a byte unit from the bit stream. The STA decodes the PLCP Header after the reception of the SFD is completed to predict how many the transmission occupies the wireless channel.

That is, the preamble and the SFD are for the synchronization of the data frame, such that the ACK may be piggybacked between the SFD and the PLCP Header of the data frame.

Figure 5:
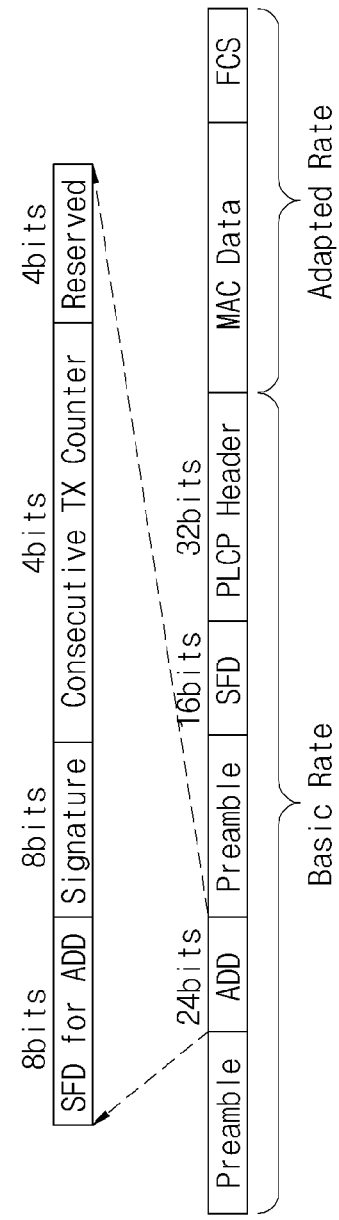
FIG. 5 is a diagram showing a frame structure according to another embodiment of the present invention.

According to another embodiment of the present invention, the ACK can be piggybacked in the middle of the preamble, as shown in FIG. 5.

From the 802.11 WLAN PHY standards, a wireless node continually searched for a preamble to detect ongoing transmission. If the preamble is detected, it synchronizes with this transmission, and changes its state to readily receive SFD. On successful SFD reception, it starts to decode PLCP header to estimate how long this transmission will seize the wireless medium. Since the synchronization process of the packet reception involves the preamble detection and the SFD reception, they are important parts of the frame reception process. Thus, piggybacking ACK should not harm these procedures.

Additionally, it is desirable for the method according to the embodiment of the present invention to be backward compatible, which implies that the nodes performing the method of the embodiment of the present invention ("CLACK-capable nodes") can co-exist with the nodes of the related art ("CLACK-incapable nodes").

To satisfy both requirements described above, the ACK ("ADD") can be inserted in the middle of the preamble, as shown in FIG. 5. In this case, the ADD has a 24-bits length, which includes 8-bits SFD for ADD as well as the signature, consecutive TX counter, and reserved.

Figure 6:
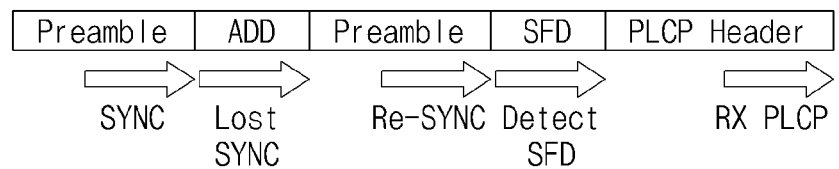
FIG. 6 is a diagram showing synchronization process according to another embodiment of the present invention.

On receiving "ADD", CLACK-incapable nodes will consider it as an erroneous preamble chunk, and lose the sync because it does not have expected bit-sequence for being the preamble. However, the CLACK-incapable nodes can re-synchronize the up-coming preamble, enabling for CLACK-capable nodes to co-exist with the legacy nodes (CLACK-incapable nodes). This procedure is depicted in FIG. 6. CLACK-capable nodes can recognize the "ADD" during the preamble reception as they know where/how "ADD" is inserted in advance. To do so, a simple but differentiable bits sequence from the preamble should be used to alarm the start of "ADD". Therefore, CLACK-capable nodes can identify the control information destined to themselves in the frame while CLACK-incapable nodes cannot.

In S420, the ACK is piggybacked in Physical Layer Convergence Procedure (PLCP). PLCP is overheard by every node in operation network because of its nature that has to be transmitted in the basic rate. That is, the ACK is transmitted at the data bit rate of the PHY layer and the data are transmitted at the data bit rate of the MAC layer. Thus, the AP can select the best rate for the quality of the link AP ->STA2 without considering the quality of the link AP ->STA1 when the AP send data to the STA2. The method of the present invention leverages reliable delivery nature of PLCP, enabling the network to use the piggybacking schemes regardless of the channel condition. That is, the data is transmitted at a high rate while maintaining the stability and reliability of the ACK transmission, thereby improving the transmission performance of the wireless network.

Figure 7:
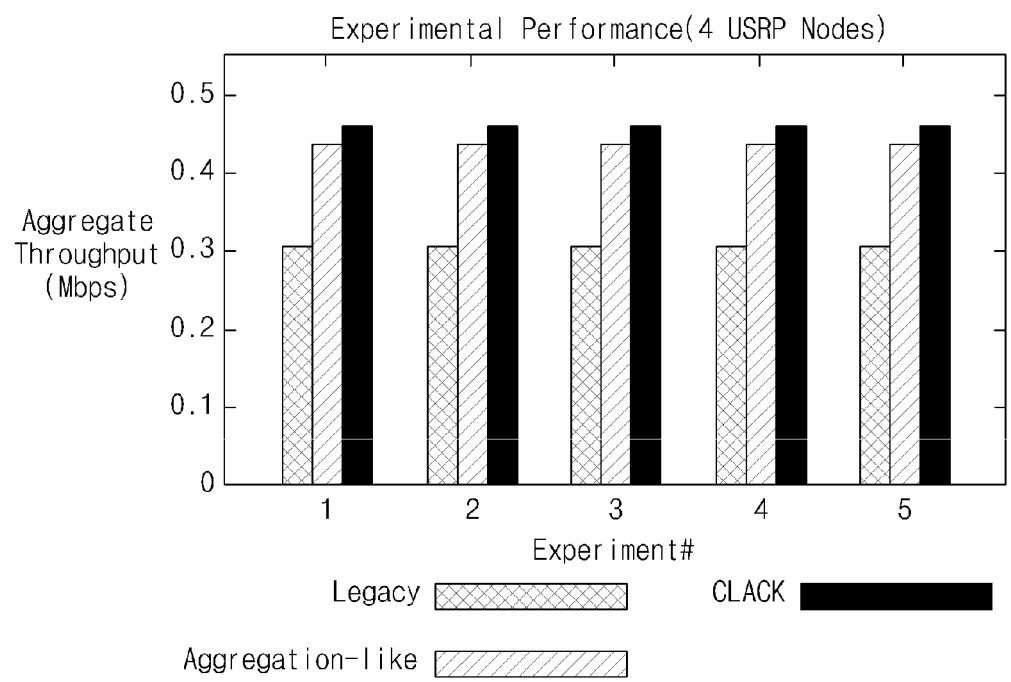
FIG. 7 is a graph showing aggregation throughput from the experiment.

FIG. 7 presents the average aggregate throughput from the experiment. We evaluated Legacy, Aggregation-like and CLACK in five independent experiments (in round robin fashion), each of which is composed of a hundred on-minute runs. Then we compute an average aggregate throughput for each set of hundred experiments. Each experiment number denotes the averaged a hundred experiments. Among the three schemes, CLACK achieves the highest aggregate throughput, while Aggregation-like achieves similarly high throughput as well. CLACK achieves the average aggregate throughput up to 152.0% when compared to Legacy, and up to 106.9% when compared to Aggregation-like.

We also present the Jain's measure of fairness in Table 1.

TABLE 1

| Schemes | Jain's fairness index |
| --- | --- |
| Legacy | 0.96 |
| Aggregation-like | 0.93 |
| CLACK | 0.94 |

Jain's fairness index is computed from following Equation 1.

$$\text{Jain's fairness index}(x_1, x_2, \ldots, x_n) = \frac{\left(\sum_{i=1}^{n} x_i\right)^2}{n \sum_{i=1}^{n} x_i^2} \quad \text{[Equation 1]}$$

Equation 1 rates the fairness of a set of values where there are n users and xi is the throughput for the node i. The result ranges from 1/n (the worst case) to 1 (the best case), and it is maximum when all users receive the same allocation. This metric identifies starving noes and is not unduly sensitive to a typical network flow patterns. We computed Jain's measure of fairness with the average aggregate throughput used above.

For all evaluated schemes, Jain's measures are above 0.93, which show that CLACK and Aggregation-like do not harm the (long term) system fairness.

Figure 8:
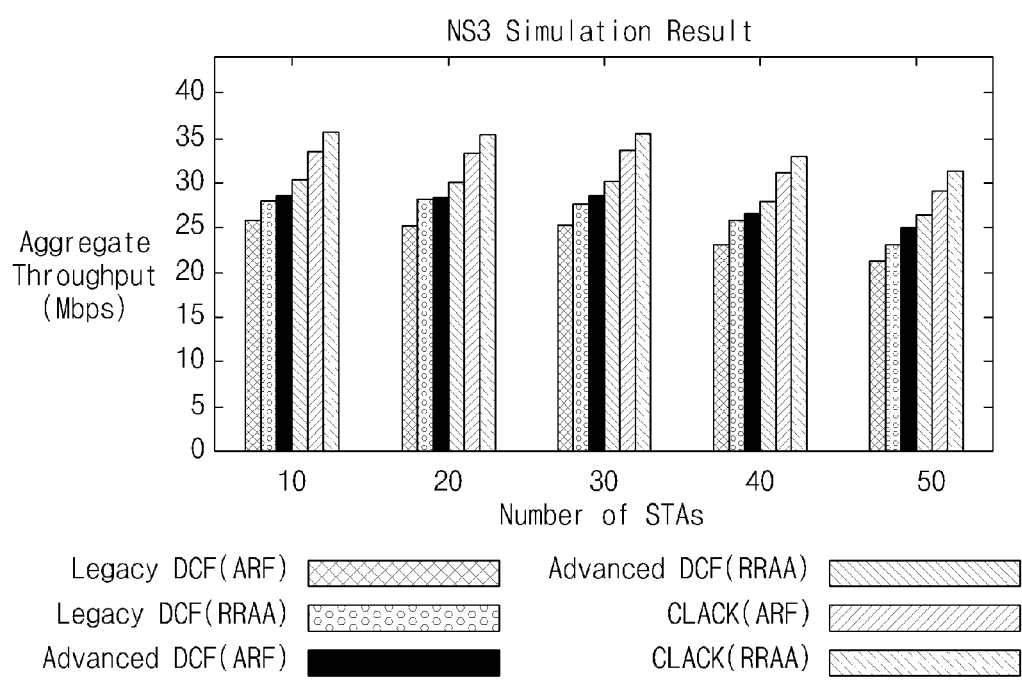
FIGS. 8 and 9 are graphs showing NS3 simulation results.
Figure 9:
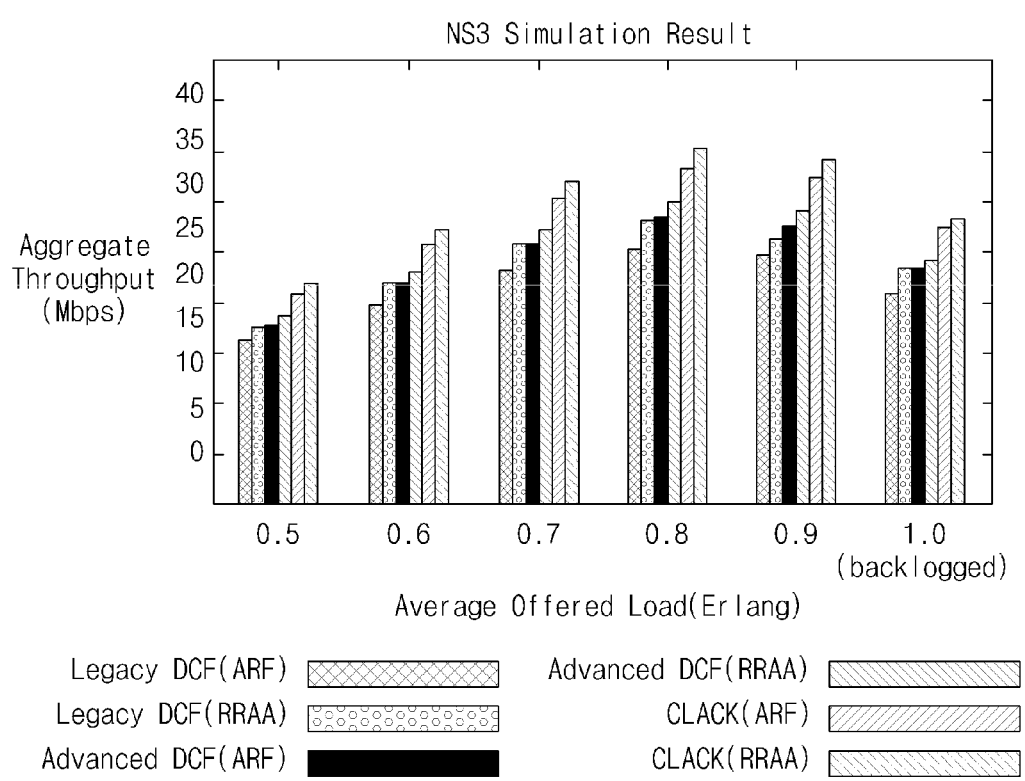

We also performed NS3 simulation to emulate practical wireless LANs within a high data rate regime. FIGS. 8 and 9 are graphs showing NS3 simulation results.

FIG. 8 presents the average aggregate throughput with varying numbers of STAs (10-50) associated with a single AP. Under both ARF and RRAA, CLACK achieves the highest aggregate throughput. CLACK achieves the average aggregate throughput up to 137% when compared to Legacy DCF, and up to 118% when compared to Advanced DCF.

To see the effect of the offered loads, again, we evaluate Legacy DCF, Advanced DCF, and CLACK, each of which is composed of ten one-minute NS3 simulations. There are 30 STAs associated with the AP. In this setup, we evaluate the performance of CLACK with varying average offered loads (0.5-1) given in the networks. As shown in FIG. 9, CLACK achieves the highest aggregate throughput in all the configured setup. The performance gains of CLACK over Legacy DCF and Advanced DCF are up to 133% and 117%, respectively.

As set forth above, the exemplary embodiments of the present invention can improve the transmission performance of the wireless network by transmitting the data, on which the ACK is piggybacked, using the ACK transmission opportunity having the high priority and thus transmitting the data while transmitting the ACK so as not to consume the channel contention time and the DIFS time.

Further, the ACK is transmitted at the data rate of the PHY layer and as a result, can be transmitted while maintaining the stability and reliability and at the same time, the data are transmitted at the data rate of the MAC layer and as a result, can be transmitted at a high rate. That is, the data are transmitted at a high rate while maintaining the stability and reliability of the ACK transmission, thereby improving the transmission performance of the wireless network.

The method according to the present invention has several advantages.

The control information piggybacked in the data frame is transmitted in a reliable way. Every node in a system, even in a rate-controlled wireless network, should transmit PLCP in rates among basic rates set to avoid a failure of PLCP transmission. Therefore, every node in the system could overhear all the PLCP transmissions, and catch the control information reliably whenever it is intended to itself.

In the method according to the present invention, destinations of the control information and the data need no to be the same. In the demonstrated scenario shown in FIG. 2, the AP's data frame can be destined to the STA2 while the control information is intended to the STA1. To do this, the transmitted frame contains multiple destination addresses to which the control information and data are intended to as described above.

The CLACK-capable networks can reduce several parts of MAC overhead. Nodes attempting to send an information-piggybacked data frame do not have to contend for wireless medium, but exploit medium access fight for the control message and opportunistically transmit the data frame after the SIFS time interval. This reduces the contention overhead which is revealed significant in performance.

A control frame such as the ACK also followed by the preamble and the PLCP and MAC header, and must be trailed by the FCS. These typically impose high overhead on the wireless system as it is transferred in the low (or basic) bit-rates. In CLACK, only mandatory information from the individual control frames are piggybacked in PLCP, avoiding highly overhead transmission of the control frame.

A data frame piggybacking a control message should not include errors in neither the data nor the control message. Due to this, a bit-rate adaptation should select the bit-rate allowable for both of them, operating in not the best bit-rate for the data link. In CLACK, the bit-rate adaptation selects the best bit-rate for the data link, thus performance gain from the rate-adaptation remains consistently whether the piggybacking scheme is used or not.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data transmission method using an ACK transmission opportunity in a wireless network including an AP and a plurality of STAs, the method comprising:
    acquiring a wireless channel by a STA to transmit a first data to the AP;
    transmitting the first data by the STA that acquired the wireless channel to the AP through the wireless channel;
    analyzing by the AP whether there are second data intended to any one of the plurality of STAs; and
    when there are the second data to transmit, transmitting the second data, on which an ACK is piggybacked before a PLCP (physical layer convergence procedure) Header, to the intended STA from the AP using the ACK transmission opportunity having higher priority than that of data transmission.

2. The method of claim 1, further comprising transmitting the ACK to the intended STA through the MAC layer when it is analyzed that there are no second data.

3. The method of claim 1, wherein the transmitting the second data includes:
    piggybacking the ACK on the second data in the PHY layer; and
    transmitting the second data on which the ACK is piggybacked to the intended STA.

4. The method of claim 3, wherein the STA acquires the wireless channel from contention with other STAs in the acquiring.

5. The method of claim 3, wherein the ACK is transmitted at a data bit rate of the PHY layer and the second data is transmitted at a data bit rate of the MAC layer.

6. The method of claim 1, wherein the ACK includes a signature field specifying destination information of the ACK, a consecutive transmission counter field for securing fairness between the STAs, and a reserved field.

7. A data transmission method using an ACK transmission opportunity in a wireless network including an AP and a plurality of STAs, the method comprising:
    acquiring a wireless channel by a STA to transmit a first data to the AP;
    transmitting the first data by the STA that acquired the wireless channel to the AP through the wireless channel;
    analyzing by the AP whether there are second data intended to any one of the plurality of STAs; and when there are the second data to transmit, transmitting the second data, on which an ACK is piggybacked, to the intended STA from the AP using the ACK transmission opportunity having a higher priority than that of data transmission, wherein transmitting the second data includes:

piggybacking the ACK on the second data in the PHY layer, and transmitting the second data on which the ACK is piggybacked to the intended STA, wherein the ACK is piggybacked between a SFD (start frame delimiter) and a PLCP (physical layer convergence procedure) Header of the second data frame.

8. The method of claim 7, wherein the ACK includes:
a signature field on which destination information of the ACK is specified;
a consecutive transmission counter field for securing fairness between the STAs; and
a reserved field.

9. The method of claim 7, further comprising when there are no second data, transmitting the ACK to the intended STA through the MAC layer.

10. A data transmission method using an ACK transmission opportunity in a wireless network including an AP and a plurality of STAs, the method comprising:

acquiring a wireless channel by a STA to transmit a first data to the AP;

transmitting the first data by the STA that acquired the wireless channel to the AP through the wireless channel;

analyzing by the AP whether there are second data intended to any one of the plurality of STAs; and when there are the second data to transmit, transmitting the second data, on which an ACK is piggybacked, to the intended STA from the AP using the ACK transmission opportunity having a higher priority than that of data transmission, wherein the transmitting the second data includes:

piggybacking the ACK on the second data in the PHY layer, and transmitting the second data on which the ACK is piggybacked to the intended STA, wherein the ACK is piggybacked in the middle of an SFD of the second data frame.

11. The method of claim 10, wherein the ACK includes:
an SFD field for the ACK;
a signature field on which destination information of the ACK is specified;
a consecutive transmission counter field for securing fairness between the STAs; and
a reserved field.

12. The method of claim 10, further comprising when there are no second data, transmitting a normal MAC-layer ACK to the intended STA.

* * * * *